US010681994B2

(12) United States Patent
Van Ceulebroeck

(10) Patent No.: US 10,681,994 B2
(45) Date of Patent: Jun. 16, 2020

(54) MODULAR PRESENTATION SYSTEM FOR THE DISPLAY AND SUPPORT OF GOODS AND BUILD-UP METHOD THEREFOR

(71) Applicant: EASYBUILD BVBA, Lier (BE)

(72) Inventor: Filip Van Ceulebroeck, Geel (BE)

(73) Assignee: Easybuild bvba, Lier (BE)

( * ) Notice: Subject to any disclaimer, the term of this patent is extended or adjusted under 35 U.S.C. 154(b) by 0 days.

(21) Appl. No.: 16/096,720

(22) PCT Filed: May 2, 2017

(86) PCT No.: PCT/EP2017/060429
§ 371 (c)(1),
(2) Date: Oct. 26, 2018

(87) PCT Pub. No.: WO2017/191137
PCT Pub. Date: Nov. 9, 2017

(65) Prior Publication Data
US 2019/0335923 A1    Nov. 7, 2019

(30) Foreign Application Priority Data

May 2, 2016  (BE) .................................. 2016/0079
Oct. 27, 2016  (DE) .................... 20 2016 006 632 U

(51) Int. Cl.
*A47F 5/16*   (2006.01)
*A47F 5/10*   (2006.01)
(Continued)

(52) U.S. Cl.
CPC .................. *A47F 5/16* (2013.01); *A47F 5/10* (2013.01); *E04F 15/02194* (2013.01);
(Continued)

(58) Field of Classification Search
CPC ........ A47F 5/16; A47F 5/10; E04F 15/02194; E04F 15/02417; E04F 15/02452; E04F 15/105
See application file for complete search history.

(56) References Cited

U.S. PATENT DOCUMENTS 4,279,966 A * 7/1981 Wakana ............... B65D 90/023
                                                      428/595
5,509,244 A * 4/1996 Bentzon ................. E01C 5/005
                                                      428/44

(Continued)

FOREIGN PATENT DOCUMENTS

WO    WO 2014/122155    8/2014

OTHER PUBLICATIONS

PCT Application Serial No. PCT/EP2017/060429; International Search Report and International Preliminary Report on Patentability, dated Apr. 18, 2018, 8 pages.

*Primary Examiner* — Paola Agudelo
(74) *Attorney, Agent, or Firm* — John H. Thomas, P.C.

(57) ABSTRACT

The invention pertains to a modular presentation system for the display and support of goods and a build-up method therefor. The system comprises floor tiles, blocks, and cover plates. Two floor tiles can be interconnected by placing the two floor tiles adjacent and subsequently mounting a connection piece in connection recesses provided in the two floor tiles. Floor tiles, blocks, and cover plates are configured to clamp on top of floor tiles and blocks. The present invention allows to quickly and efficiently build up the modular presentation system.

20 Claims, 9 Drawing Sheets

(51) Int. Cl.
*E04F 15/02* (2006.01)
*E04F 15/024* (2006.01)
*E04F 15/10* (2006.01)
*F16B 5/06* (2006.01)

(52) U.S. Cl.
CPC .. *E04F 15/02417* (2013.01); *E04F 15/02452* (2013.01); *E04F 15/105* (2013.01); *F16B 5/0607* (2013.01); *E04F 2201/0505* (2013.01); *E04F 2290/02* (2013.01); *F16B 2005/0678* (2013.01)

(56) References Cited

U.S. PATENT DOCUMENTS

| | | | | |
|---|---|---|---|---|
| 6,648,715 B2* | 11/2003 | Wiens | ................ | A63H 33/062 |
| | | | | 446/121 |
| 6,820,950 B1 | 11/2004 | Sun | | |
| 7,914,228 B2* | 3/2011 | Rapaz | ................ | E01C 5/005 |
| | | | | 404/34 |
| 8,146,517 B1* | 4/2012 | Masser | ................ | E04F 15/105 |
| | | | | 108/156 |
| 8,205,407 B2* | 6/2012 | Genova | ................ | E04B 5/026 |
| | | | | 52/582.1 |
| D791,885 S * | 7/2017 | Rosan | ................ | D21/500 |
| 2005/0172567 A1* | 8/2005 | Mead | ................ | E04F 15/02417 |
| | | | | 52/126.6 |
| 2006/0260223 A1* | 11/2006 | Wang | ................ | E04F 13/0862 |
| | | | | 52/177 |
| 2007/0266669 A1* | 11/2007 | Rapaz | ................ | E01C 5/005 |
| | | | | 52/638 |
| 2007/0280782 A1* | 12/2007 | Rogers | ................ | E01C 9/086 |
| | | | | 404/35 |
| 2011/0179728 A1 | 7/2011 | Cerny et al. | | |
| 2012/0266549 A1* | 10/2012 | Rosan | ................ | E01C 5/20 |
| | | | | 52/173.1 |
| 2013/0167458 A1* | 7/2013 | Cerny | ................ | E04F 15/02038 |
| | | | | 52/177 |
| 2015/0361675 A1 | 12/2015 | Cerny et al. | | |

\* cited by examiner

MODULAR PRESENTATION SYSTEM FOR THE DISPLAY AND SUPPORT OF GOODS AND BUILD-UP METHOD THEREFOR

CROSS-REFERENCE TO RELATED APPLICATIONS

This is a National Stage Entry into the United States Patent and Trademark Office from International PCT Patent Application No. PCT/EP2017/060429, having an international filing date of May 2, 2017, the contents of which is incorporated herein by reference in its entirety. This application is a continuation application of U.S. application Ser. No. 15/276,813 filed Sep. 27, 2016 and claims the priority to Belgium Application No. BE2016/0079 filed May 2, 2016, and German Application No. 20 2016 006 632.4 filed Oct. 27, 2016, the contents of each of which are incorporated herein by reference.

TECHNICAL FIELD

The invention pertains to a modular presentation system for the display and support of goods and a build-up method therefor. The system comprises floor tiles, blocks, and cover plates. Two floor tiles can be interconnected by placing the two floor tiles adjacent and subsequently mounting a connection piece in connection recesses provided in the two floor tiles. Floor tiles, blocks, and cover plates are configured to clamp on top of floor tiles and blocks. The present invention allows to quickly and efficiently build up the modular presentation system.

BACKGROUND

It is well known in the art that portable floor systems can consist of connectable structural elements:
US 2002/0 108 323 discloses a portable graphic floor system;
US 2006/0 016 136 discloses a modular floor tile system with transition edge;
US 2010/0 263 317 discloses a modular decking system;
US 2015/0 361 675 discloses a synthetic modular flooring apparatus;
US 2015/0 376 904 discloses a modular molded mat with exposable ramp surfaces;
U.S. Pat. No. 841,998 discloses a tile flooring;
U.S. Pat. No. 5,509,244 discloses a flooring system having joinable tile elements, particularly plastic tiles;
U.S. Pat. No. 6,233,886 discloses a floor assembly and an associated method of making a floor assembly; and
US D456 533 S1 discloses a modular floor tile with a diamond plate surface.

These systems are however not configured for the stacking of floor tiles. Therefore these systems are not configured for creating higher elements, e.g. to create an elevated presentation podium. The elevated presentation of products is in commercial environments often a desired characteristic. Users desire an elevated presentation podium to create a larger visual distinction with the floor.

These systems are furthermore not configured for the transit and/or stowing away of cables. Often a technical horizontal space is desired to stow away data- or electricity cables. It is often difficult to stow away cables without changing the route of the cables.

The systems disclosed in US 2006/0 016 136, US 2015/0 361 675, US 2015/0 376 904, and US D456 533 S1 comprise tiles comprising connecting protrusions at their sides. In order to hide the protrusions the edge of a modularly built floor should then comprise a delimiting connector to hide these protrusions.

The systems disclosed in US 2010/0 263 317, U.S. Pat. Nos. 841,998, 5,509,244, and 6,233,886 comprise connection elements for interconnecting tiles. The systems are however not configured for the storage of connection elements. Therefore connection elements can easily get lost during transportation or installation of a modular floor.

The system disclosed in US 2002/0 108 323 requires to build up and break down the modular floor from the sides. This severely limits the flexibility of installation.

The use of cover plates is also well-known in the art:
US 2008/0 118 7 03 discloses a removable surface covering for drainage;
WO 2006/102 062 discloses a user configurable stackable display;
DE 3 819 164 discloses a cladding panel for exterior claddings or interior use;
U.S. Pat. No. 5,673,529 discloses a stone cladding system; and
CN 102 947 872 discloses an enhanced non-slip floor graphics logo.

A disadvantage of the system disclosed in WO 2006/102 062 is the structural function of the finishing plates due to which they are difficult to change.

A disadvantage of the covers disclosed in DE 3 819 164 and U.S. Pat. No. 5,673,529 is that the materials and construction techniques are expensive. A disadvantage of the floor system disclosed in CN 102 947 872 is that the insertable graphics plates are often expensive semi-manufactured goods.

WO 2014/122 155 discloses a construction kit with closed surfaces for building modular displays in the field of furniture, stages and display units. The kit comprises a structural panel, a rib panel, a corner element, and a connecting element. A disadvantage of the construction kit is the plurality of parts and required interconnections. As a result of the many mechanical interconnections, a plurality of seams is present which causes a presentation podium to comprise a very technical appearance. As a result of the plurality of parts, the labor cost for construction is large. The enlarged flexibility also comes at the cost of a lower user friendliness. Users of such a presentation podium often lack a technical background and the required time for buildup. To build up said modular display the user requires several parts. Building up a volume can be realized with several profiles, several plates and several coupling elements which is very labor intensive. This results in high labor costs which is an important objection for, for example, shop window builders.

It is well-known that presentation podia can be constructed with a combination of blocks. CH 699 151 discloses an attachmentless stackable furniture system with a side panel exchange frame. A disadvantage is the need to produce frames with a profile. While this achieves high flexibility, the assembled system will however comprise a plurality of visible seams which is perceived as visually unattractive.

EP 1 743 844 discloses a stackable crate for the storage and transportation of goods. Often these crates are produced with an injection molding process and they comprise means to stack or nest multiple crates. US 2003/0 024 845 discloses a stackable crate for holding and transporting products. A disadvantage of these stackable crates is that they comprise an open top and are therefore not suitable for placing products on them for display.

U.S. Pat. No. 6,820,950 discloses a modular case for holding articles. EP 0 621 063 discloses a block assembly.

U.S. Pat. No. 3,836,217 discloses a box-shaped furniture unit. The buildable systems disclosed in U.S. Pat. No. 6,820,950, EP 0 621 063 or U.S. Pat. No. 3,836,217 comprise a multitude of different parts which causes the buildup to be labor intensive.

DE 20 2004 016 911 discloses a modular storage system comprising stackable boxes and an interchangeable top cover. The top cover is provided with strengthening ribs. The system is mostly used for the presentation of other products which may be heavy. The system furthermore does not comprise horizontal connections, due to which it is not possible to build up a modular system which is mechanically connected.

The present invention aims to resolve at least some of the problems mentioned above.

SUMMARY OF THE INVENTION

In a first aspect, the present invention provides a modular presentation system for the display and support of goods, as provided in claim 1.

In a second aspect, the present invention provides a build-up method for a modular presentation system for the display and support of goods, as provided in claim 14.

The present invention is advantageous for several reasons. The system and method are configured to quickly and efficiently build up the modular presentation system. The system and method are for example configured to allow adding and/or removing central floor tiles, without displacing other floor tiles. Floor tiles can be laid out as desired, and without further movement of the floor tiles subsequently interconnected by means of the connection pieces. As cover plates and blocks are typically vertically stacked on top of blocks and floor tiles, the horizontal relative movement of two blocks or cover plates is restricted due to the interconnected floor tiles on which they are stacked.

DESCRIPTION OF FIGURES

FIG. 4 shows a modular construction (5) comprising a number of floor tiles (1) forming a modular floor basis (6) comprising a closed-off support surface (3) and a number of blocks (7) comprising a closed-off support surface (3) and an upstanding edge (2) where more blocks (7) or cover plates (8) can clamp on.

FIG. 5 shows a modular construction (5) comprising a number of floor tiles (1) forming a modular floor basis (6) and a number of blocks (7) comprising a closed-off support surface (3) and an upstanding edge (2) where more blocks (7) or cover plates (8) can clamp on.

FIG. 6 shows a modular construction (5) comprising a number of floor tiles (1) cladded with cover plates (8) forming a modular floor basis (6) and a block (7) comprising a closed-off support surface and an upstanding edge (2) where more blocks (7) or cover plates (8) can clamp on.

FIG. 15 shows a modular construction (5) comprising a number of floor tiles (1) forming a modular floor basis (6) and a block (7) which can be placed at different locations on the modular floor basis and comprising a closed-off top surface (3) and upstanding edges (2) where more blocks (7) can clamp on.

DETAILED DESCRIPTION OF THE INVENTION

Figure 1:
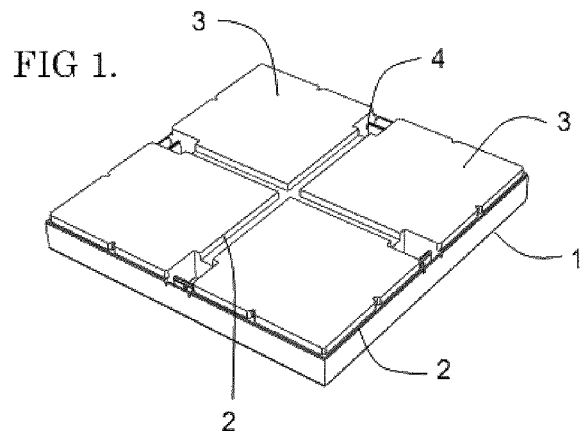
FIG. 1 shows a floor tile (1) comprising an upstanding edge (2), a closed-off support surface (3), and a storage space (4) to store a clampable connection piece.
Figure 2:
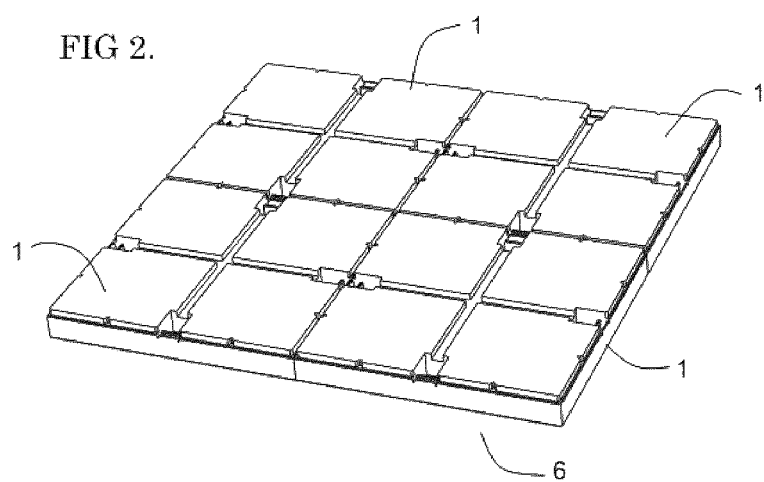
FIG. 2 shows a construction comprising four floor tiles (1) forming a modular floor basis (6) unit.
Figure 3:
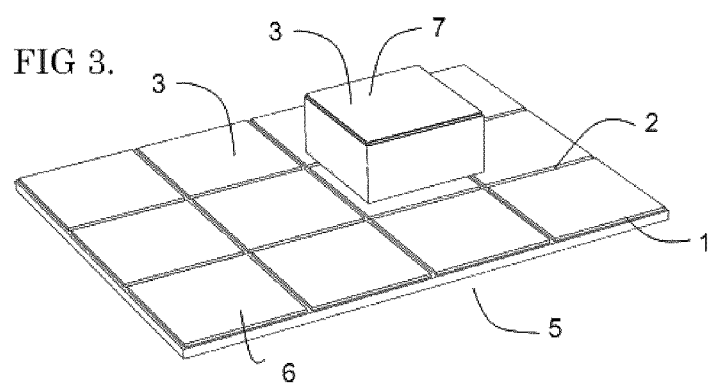
FIG. 3 shows a modular construction (5) comprising floor tiles (1) cladded with cover plates (8) and comprising upstanding edges (2) with a closed-off support surface (3) and a block (7) clampable on the upstanding edges (2) of the floor tiles (1).
Figure 4:
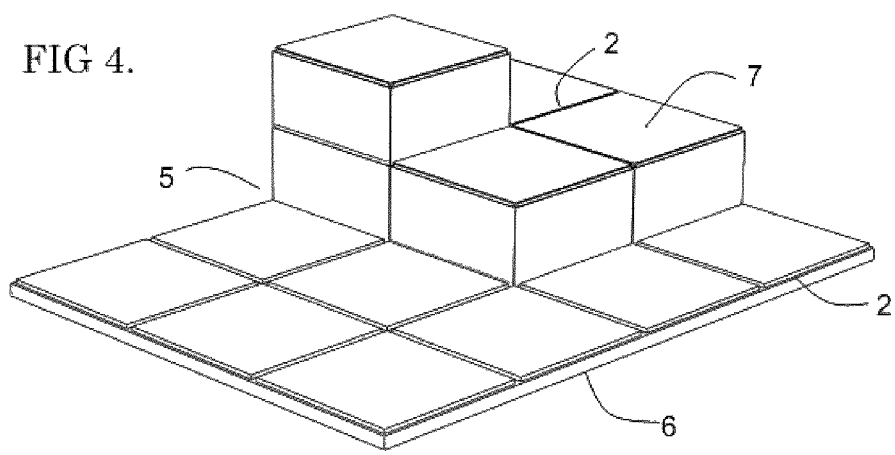
Figure 5:
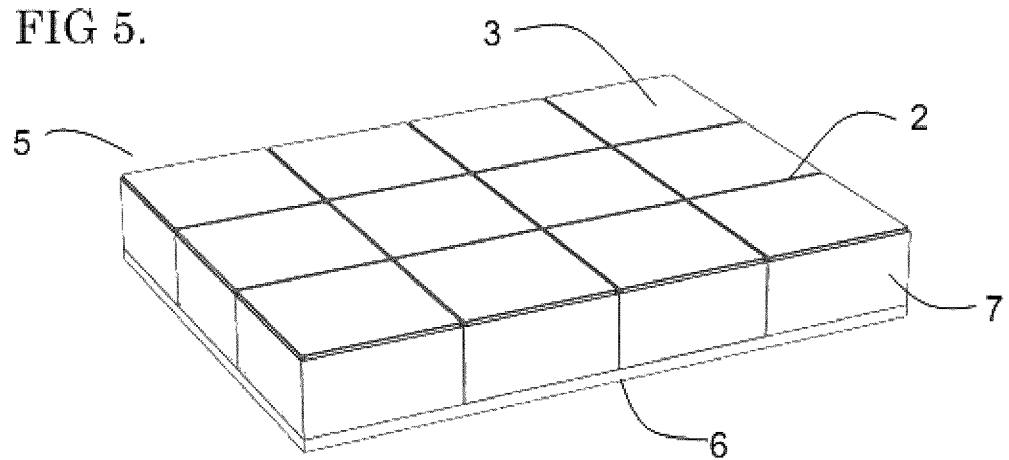
Figure 6:
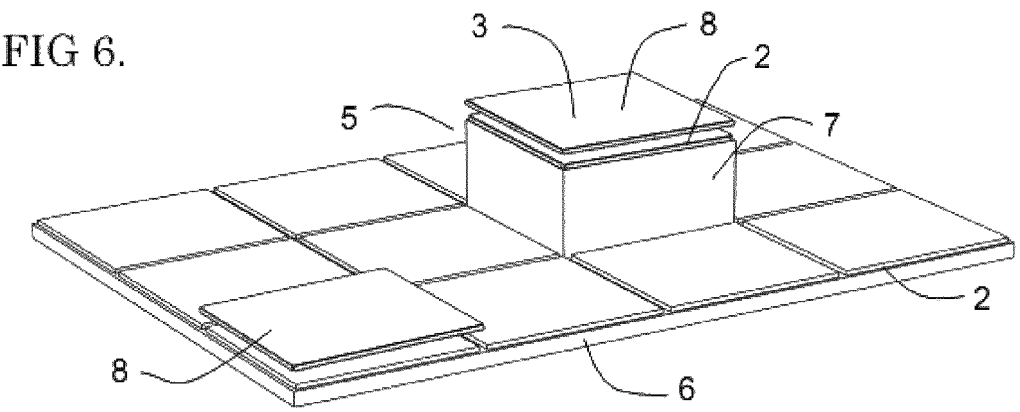
Figure 7:
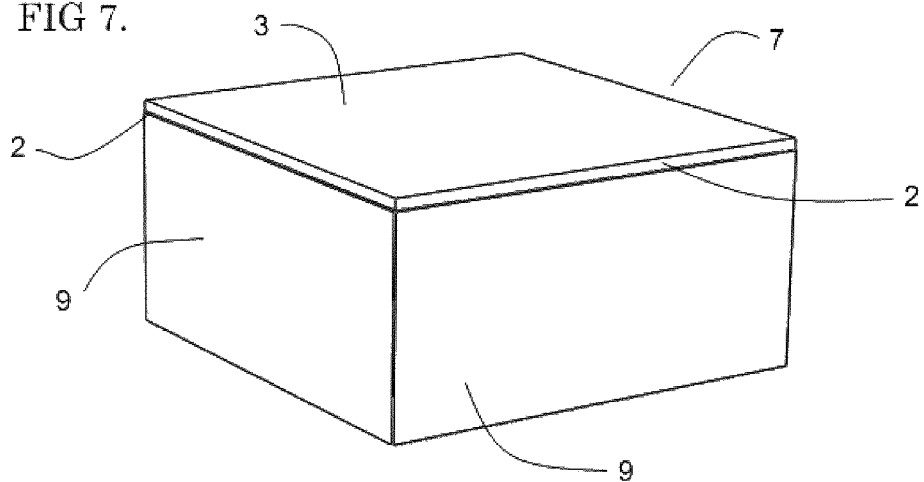
FIG. 7 shows a perspective view of a block (7) comprising upstanding edges (2), a closed-off support surface (3), and a closed-off sidewall (9).

The present invention concerns a modular presentation system for the display and support of goods and a build-up method therefor. A summary of the invention is given in the corresponding section. In what follows, the invention will be described in detail, preferred embodiments are disclosed, and the invention will be illustrated with examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The invention pertains to a construction kit and more specifically to modular floor tiles for the construction of an elevated modular floor basis with detachable and interchangeable cover plates. More specifically, the invention pertains to stackable floor tiles and corresponding blocks which can be assembled continuously or discretely vertically and horizontally to a presentation podium to present products. The main goal of the invention is to achieve improved coupling means for creating a construction comprising assembled floor tiles, blocks, and cover plates due to which a large diversity of elevated surfaces with different heights and shapes can be made and which effectuate an in essence seamless and uniform appearance.

Modular floor systems are used to create an artificial support surface. The main application of this invention is the construction of elevated surfaces and presentation podia comprising integrated presentation pedestals and cover plates for the presentation of products. More specifically in shops or exposition halls, the combination of a presentation pedestal integrated with a modular floor provides the possibility to create a visually uniform entirety to present products in a sufficiently distinctive way from the environment.

The present invention provides mutually vertically stackable floor tiles and blocks. The present invention provides a solution to provide sufficient height to a presentation surface.

Due to the universal character of the construction kit a diverse range of presentation surface configurations can be built in a quick and efficient way with a minimum of labor. The construction kit is mainly intended to create a modular floor basis in combination with presentation pedestals which are mainly low, preferably lower than a meter. The construction kit has not been devised to create open cavities although this goal is not entirely excluded. The main goal is to provide a presentation surface to present and support goods.

Presentation pedestals are block-shaped bodies which are used to present products at a height from the ground. The present invention provides for a construction comprising floor tiles and presentation pedestals which are visually integrated so that podia with different heights can be made in a uniform visual style. The uniform visual style can be achieved between the floor and the presentation pedestals because uniform shapes, materials, and cover plates can be used.

Presentation pedestals are traditionally manufactured out of a monolithic plate material such as wood, metal or plastic. An advantage of this construction is low number of seams which are visible. A disadvantage of presentation pedestals made of a monolithic material is that the presentation pedestals are statically shaped and their form or outer finishing cannot be easily changed. In environments where presentation pedestals are often used such as shops, exposition halls, and musea, it is desired to regularly make adjustments in the size or appearance of the presentation pedestals. The present invention discloses a construction kit comprising floor tiles, blocks, and cover plates and is suitable for the construction of furniture, floors, and presentation pedestals. Because floor tiles and blocks as disclosed in the present invention can be mutually interchanged as well as combined with decorative cover plates, different constructions with a diverse appearance can easily be made.

The present invention is characterized in that only the floor tiles are horizontally connectable. The floor tiles can be horizontally magnetically or mechanically interconnected. The floor tiles of the present invention can therefore be vertically stacked and horizontally interconnected. These interconnections are used to horizontally connect modular constructions. Because only floor tiles should be horizontally connected, the blocks of the construction kit should not be horizontally interconnectable, due to which the blocks comprise in essence seamless upright sides. A horizontal connection between blocks is made via the floor plates on which they clamp and the interconnections between the floor plates. Blocks can furthermore be mounted on floor plates at different horizontal positions.

The blocks and the floor tiles can be covered with a cover plate, as to guarantee uniform aesthetics over the construction. The cover plate is executed as a plate with upstanding surrounding edges. The cover plate allows to add adjusted decorations or patterns to the presentation pedestal as to cover the modular construction kit in an aesthetic way. The cover plate can according to the needs and desires of the customer be provided with the necessary decoration. The cover plates can be transparent, opaque or directly printed and can be quickly and easily changeable by means of an optional clamping means. This allows to achieve the transition between adjacent cover plates or with a block in an aesthetically responsible way.

The blocks and the floor tiles are preferably manufactured out of plastic with the advantage that they are lightweight and still comprise sufficient rigidity. The different parts are preferably monolithic and are manufactured according to a well-known technique, such as injection molding.

The ground surface of the elements comprise preferably a length and a width of 40 cm due to which the entire surface of an assembly fits within the measures of a Europallet, which is an efficient standard for transport.

The elements of the invention comprise preferably edges and corners which are slightly beveled. The bevel of the edges is preferably in between 3 and 6 millimeter. When a construction is made of different elements, the beveled edges of adjacent corresponding elements will be mirrored with respect to each other, which results in an assembled seam which comprises the visual appearance of a diamond and which is aesthetically pleasing for a spectator.

Optionally, the blocks comprise upright edges at the inside of the support surface. These round upright edges are positioned in the middle of the blocks and can be used for the transit of cables, the insertion of office insertables or extensions to mount bicycles or other products.

An important desired product characteristic of presentation pedestals is that they comprise a smooth surface with few seams. The blocks and cover plates as described in the construction kit each comprise four closed-off upright sides and a closed-off support surface and no means to make horizontal connections, due to which the sides and top have an in essence seamless appearance, due to which the elements and constructions do not comprise a technical appearance.

An advantageous characteristic of the floor tiles is the provision of a space in the support surface of the floor tiles in the length and width directions to store cables lower than the support surface.

An advantage of the present invention is the ability to mount a clampable connection piece in a floor tile when it is not used.

An advantage of the present invention is that the buildup and breakdown does not have to start at the sides, but can, for example, start at a central floor tile. This is possible because the clampable connection piece approaches floor tiles from above, i.e. from the support surface.

An advantage of the interchangeable cover plates is that they do not comprise a structural function and that they therefore require less material for production and they are therefore cheaper to produce. A further advantage of the interchangeable cover plates is that they are not clamped in the construction, due to which cover plates can be easily replaced. Use of the present invention is characterized in that users often want to make adjustments after installation.

An advantage of the present invention is that the floor tiles involve a structural function, but that their support surface is visually covered by cover plates, due to which the production of the floor tiles entails only few visual demands, due to which, for example, recycled materials can be used for the production of the floor tiles.

An advantage of the cover plates in plastic manufactured with an injection molding process is that they are cheap to manufacture. Flat cover plates without internal rib structure with a projected surface area larger than 1500 $cm^2$ manufactured with plastic in an injection molding process is very difficult. Injection molding is a process under high pressure due to which production pieces build up a large internal tension during the injection and solidification of the material. Because of this, the cover plates will attempt to warp after the injection molding process due to which they become unusable. An additional disadvantage of injection molding of large surfaces is the increasing difficulty of filling the entire mold when the cover plate becomes thinner. The use of different injection points for filling a thin surface may help but has the disadvantage that visually perceivable flow fronts form where the material touches during injection. The present invention is advantageous as the cover plates comprise upright edges and internal flow channels which render the injection molding process easier and result in an entirely flat cover plate.

An advantage of the present construction kit is that a block is a single entity and does not comprise seams at its surface. The openings in between elements are as small as possible for the construction comprising the elements to visually appear as a single entity.

An advantage of the present construction kit is that blocks are stackable but also comprise a closed-off support surface so that products can be placed on top of the blocks.

An advantage of the invention is that the construction kit comprises a few large volumes. The block-shaped volumes as disclosed in this invention preferably comprise a projected surface area larger than 35 cm length and 35 cm width, due to which only a few parts are required to assemble a presentation pedestal, and due to which only few seams will be present. For the creation of a presentation pedestal comprising three blocks there are only two horizontal seams visible. An advantage of the invention is that the visible seams are divided over a regular pattern which is perceived as visually aesthetic.

In one or more aspects, the invention concerns:
1. A modular system, consisting of:
   a. one or more floor tiles, of which each floor tile consists of a rectangular panel comprising four identical upright sides, an upper face, and a lower face, whereby the upper face is in essence fully flat and closed off, whereby the lower face is open and comprises an internal rib structure, whereby the four upright sides narrow towards the upper edges due to which the upper face forms an upstanding edge, whereby the lower face is configured to clamp on the upper face of a floor tile, and whereby the four identical upright opposite sides comprise openings for connection elements which are configured to connect form congruent clampable connection pieces with adjacent sides of the same structural plate;
   b. one or more blocks, consisting of a rectangular panel comprising four identical upright sides, an upper face, and a lower face, whereby the upper face is in essence fully flat and closed off, whereby the lower face is open and comprises an internal rib structure, whereby the four upright sides narrow towards the upper edges due to which the upper face forms an upstanding edge, and whereby the lower face is configured to clamp on the upper faces of floor tiles and blocks; and
   c. one or more interchangeable cover plates, consisting of a rectangular panel comprising four identical upright sides, an in essence closed-off and flat upper face, and an open lower face, characterized in that they comprise a same surface area as and are clampable on the upper faces of floor tiles and blocks.
2. A modular system as described above and characterized in that the blocks and floor tiles are mutually stackable.
3. A modular system as described above and characterized in that the sides of vertically stacked floor tiles, blocks and cover plates lie in a same vertical plane and are bounded by this vertical plane, whereby in essence no parts deviate horizontally from this vertical plane and thus form an in essence seamless vertical surface.
4. A modular system as described above and characterized in that the floor plates in the same horizontal plane can be interconnected with a connector tool.
5. A modular system as described above and characterized in that the upright sides of floor tiles, blocks and cover plates are in essence seamless.
6. A modular system as described above and characterized in that the upper faces of blocks and cover plates are in essence seamless.

7. A modular system as described above and characterized in that floor tiles comprise employable clamping connection pieces to be able to be interconnected horizontally.
8. A modular system as described above and characterized in that blocks, cover plates and floor tiles are form congruent and comprise an approximately same projected surface area, their mutual horizontal position in a vertical stack therefore fully fixed.
9. A modular system as described above and characterized in that blocks, cover plates, and floor tiles comprise beveled edges, the bevel of edges preferably in between 3 and 6 millimeter.
10. A modular system as described above and characterized in that the upper face of a floor tile comprises a cross-shaped recess due to which four identical upstanding volumes are formed.
11. A modular system as described above and characterized in that the cross-shaped recess on the upper face of the floor tile comprises several upstanding edges on which blocks, floor tiles and cover plates can clamp on several horizontal positions.
12. A modular system as described above and characterized in that the cross-shaped recess in the upper face of the floor tile provides space for the transit of for example cables through the entire surface.
13. A modular system as described above and characterized in that the floor tiles comprise a cavity in which clamping connection pieces for horizontal connection can be stored.
14. A modular system as described above and characterized in that connection pieces of these floor tiles can be stored in a space provided in a floor plate.
15. A modular system as described above and characterized in that floor tiles, blocks and interchangeable cover plates comprise corners and edges with an identical bevel.
16. A modular system as described above and characterized in that a cover plate comprises a wall thickness larger than 1 millimeter and smaller than 3 millimeter.
17. A modular system as described above and characterized in that the construction kit is manufactured in molded plastic, preferably a thin-walled thermoplastic.
18. A modular system as described above and characterized in that the length and width of the lower face of a floor tile, block, and cover plate are in essence identical.
19. A modular system as described above and characterized in that upper faces of floor tiles and blocks form a strong support surface.
20. A modular system as described above and characterized in that a floor tile comprises vertical support points with a height equal to the height of the sides, running from the upper to the lower face, in which the vertical support points are nestable in the upper face of the floor tile.
21. A modular system as described above and characterized in that the length and width of the lower face are larger than 35 centimeters.

In a first aspect, the present invention provides a modular presentation system for the display and support of goods. The system comprises two or more floor tiles, one or more blocks, one or more cover plates, and one or more connection pieces. Each floor tile comprises a top floor surface, floor sidewalls to support the top floor surface, and at least one connection recess. The floor sidewalls hereby define an open bottom floor face. Each block comprises a top block surface and block sidewalls to support the top block surface. The block sidewalls hereby define an open bottom block face. Each cover plate comprises a top cover surface and cover sidewalls defining an open bottom cover face. Each of the open bottom floor, block, and cover faces is adapted to clamp the corresponding sidewalls which define the open bottom face over a top floor or block surface. Each connection piece is configured for interconnecting two floor tiles by mounting the connection piece in a connection recess in each of said two floor tiles after placing said two floor tiles adjacent. Preferably, the connection piece hereby approaches the floor tiles from above, i.e. from the top floor surface. In this case, the connection piece and the connection recesses of said two floor tiles are configured for mounting the connection piece in these connection recesses via approach of the connection piece towards the connection recesses from the top floor surfaces of said two floor tiles. More specifically, the connection piece and the connection recesses of said two floor tiles are configured for mounting the connection piece in these connection recesses after placing said two floor tiles adjacent, via approach of the connection piece towards the connection recesses from the top floor surfaces of said two floor tiles.

This is advantageous for several reasons. The modular presentation system can be quickly and efficiently built up. Floor tiles can first be placed adjacent into their desired positions, before they are interconnected by means of a connection piece. During this interconnection, the floor tiles do not have to be moved anymore. Floor tiles can be added and/or removed without interfering with the other floor tiles. In a free spot, a floor tile can be placed adjacent to one or more other floor tiles, and subsequently connected to said one or more other floor tiles by mounting one or more connection pieces. A floor tile can also be removed from a floor basis, by dismounting the connection pieces with which it is attached, and subsequently removing the unattached floor tile from in between the other floor tiles, without having to move the other floor tiles.

Blocks and cover plates are stacked up on top of the floor tiles, typically in a vertical stack direction for horizontally interconnected floor tiles. Thereby, the blocks and cover plates can clamp on lower elements. Building up a presentation podium with the modular presentation kit therefore does not require the horizontal interconnection of, for example, adjacent blocks. The relative horizontal position of adjacent blocks is fixed because they are vertically directly or indirectly (via other blocks or floor tiles) clamped on floor tiles which are horizontally interconnected.

Figure 9:
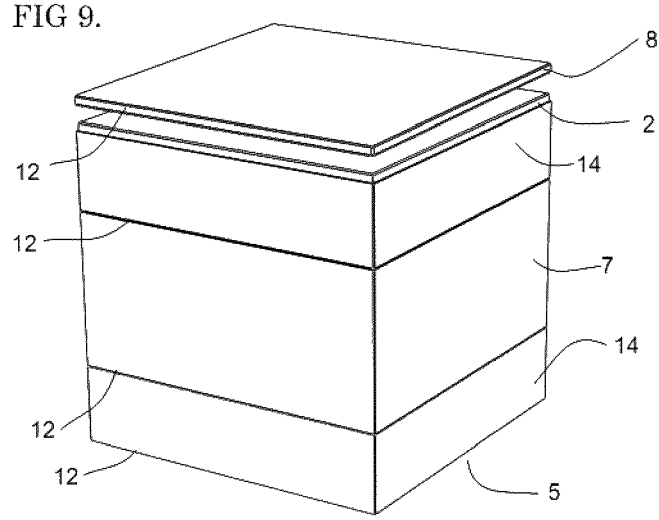
FIG. 9 shows a modular construction (5) comprising a block (7), smaller blocks (14) comprising upstanding edges (2), and a cover plate (8).
Figure 10:
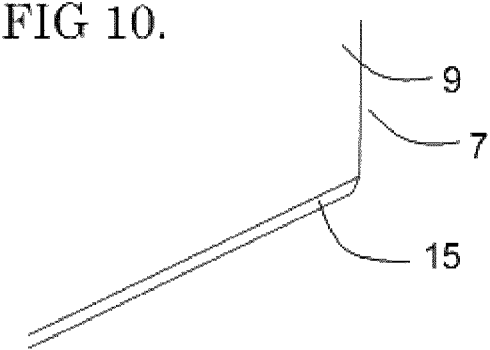
FIG. 10 shows a detail of a block (7) comprising a closed-off sidewall (9) and beveled edges (15).
Figure 11:
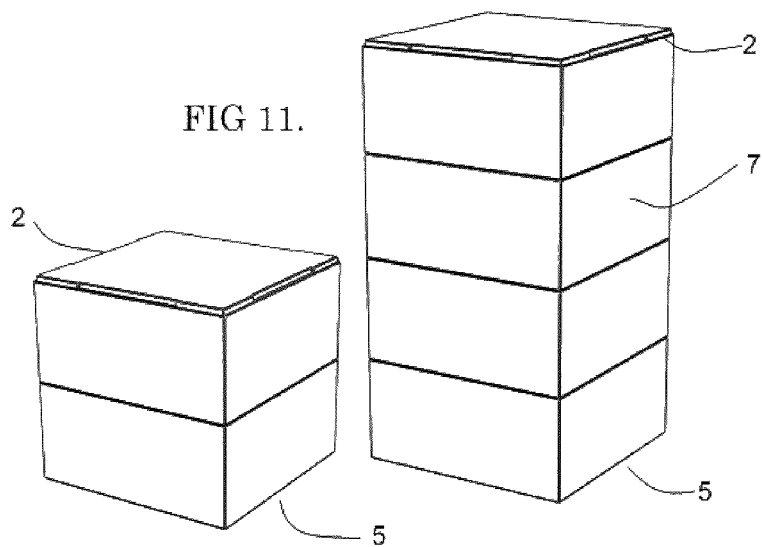
FIG. 11 shows a modular construction (5) comprising a block (7) comprising upstanding edges (2).

Floor tiles and blocks can be stacked on top of floor tiles and blocks. This allows for, for example, efficient transportation to a truck, storage room, or exposition area. This also allows the creation of presentation pedestals of various heights, allowing to adapt the height to one's needs. Furthermore, blocks of different height (7, 14) can be provided in the modular presentation system, as shown in FIG. 9.

Figure 8:
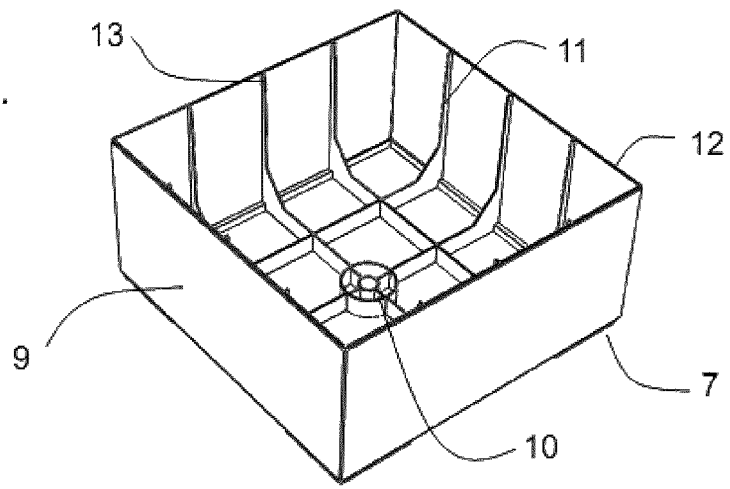
FIG. 8 shows a perspective view of a block (7) comprising closed-off sidewalls (9), a support point (10), strengthening ribs (11) and means (12) to clamp on upstanding edges.

In a preferred embodiment, all open bottom faces of floor tiles, blocks, and cover plates comprise an in essence mutually identical common size and common shape. Preferably, said open bottom faces are bounded by the sidewalls (9), which provide at the open bottom faces the means (12) to clamp on floor tiles or blocks, as shown in FIG. 8.

In a preferred embodiment, said common shape of said open bottom faces is a regular convex polygon which allows for tessellation of a floor. In a more preferred embodiment, said common shape is one of an equilateral triangle, a square, or a regular hexagon. With these shapes, a floor can be covered without overlaps or gaps. Furthermore, an equilateral triangle comprises threefold rotational symmetry, a square fourfold rotational symmetry, and a regular hexagon sixfold rotational symmetry. This allows the floor tiles, blocks, and cover plates to be used in various orientations. Preferably, a floor tile comprises one connection recess per sidewall. For a square-shaped open bottom face, a floor tile preferably comprises four connection recesses. For a triangle-shaped open bottom face, a floor tile preferably comprises three connection recesses. For a hexagon-shaped open bottom face, a floor tile preferably comprises six connection recesses. This allows to interconnect a floor tile to each adjacent tile.

In a preferred embodiment, a connection piece comprises snap hooks and handles for dismounting the connection piece. A connection recess thereby comprises a protrusion behind which at least one of the snap hooks can be positioned. Furthermore, the connection piece preferably comprises a recess for insertion of two contacting pieces of sidewall of adjacent floor tiles. Furthermore, the connection recesses preferably comprise a width only slightly larger than the width of a connection piece. The connecting function of a connection piece can then be appreciated as follows:

- Two floor tiles are positioned adjacent, thereby having two contacting sidewalls.
- The recess of the connection piece is placed over two contacting pieces of sidewall of the adjacent floor tiles, thereby prohibiting the relative horizontal movement of the sidewalls away from each other, i.e. in a direction perpendicular to the contacting sidewalls.
- A snap hook is clicked behind a protrusion of a connection recess of each of the two adjacently placed floor tiles, thereby preventing the accidental removal of a connection piece when a pulling force is exerted on the two adjacently placed floor tiles as to separate them in a direction perpendicular to the contacting sidewalls, thereby further preventing the relative vertical movement of the sidewalls as this requires to lift a snap hook over a corresponding protrusion.
- As the width of a connection piece is only slightly smaller than the width of a corresponding recess, a mounted connection piece further prevents the relative horizontal movement of the contacting sidewalls in a direction parallel to the contacting sidewalls.
- For dismounting the connection piece, the handles should first be pressed together, after which it becomes possible to lift up the connection piece away from the recesses, because the relative positions of the snap hooks and protrusions are no longer preventing the removal of the connection piece.

Figure 17:
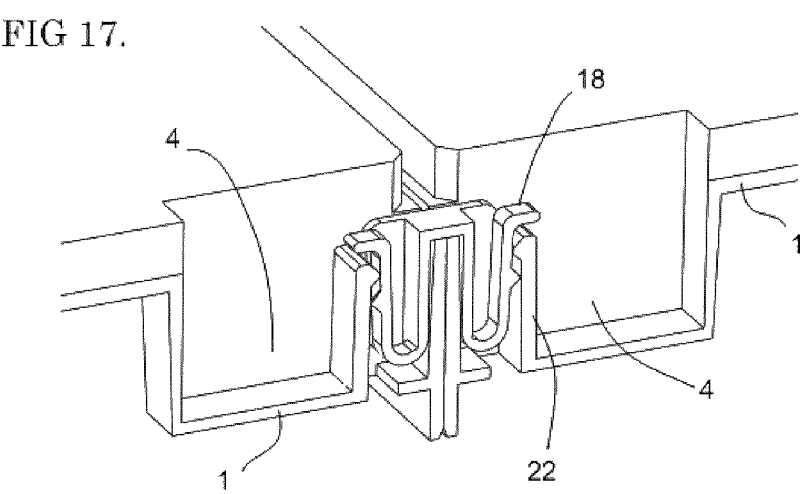
FIG. 17 shows a cross section of two floor tiles (1) and spaces (4) to store a clampable connection piece (18) and a clampface of the floor tiles (22).
Figure 18:
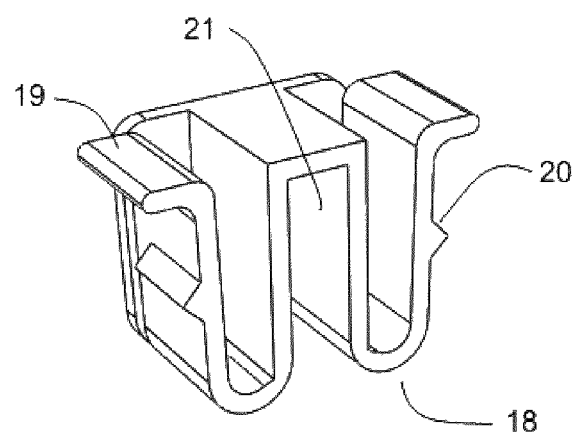
FIG. 18 shows a cross section of a clampable connection piece (18) to interconnect floor tiles, wherein the clampable connection piece comprises handles (19) to dismount the clampable connection piece and snap hooks (20) which provide the clamping functionality.
Figure 19:
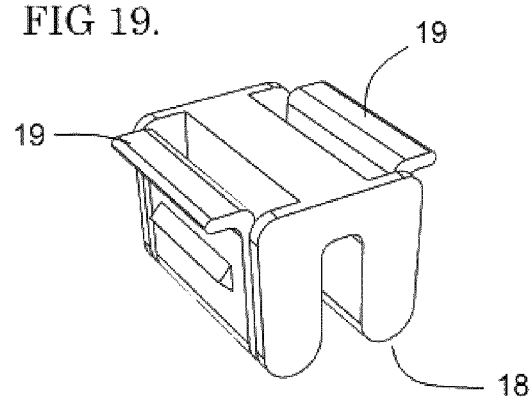
FIG. 19 shows a clampable connection piece (18) to interconnect floor tiles comprising handles (19) to dismount the clampable connection piece.
Figure 20:
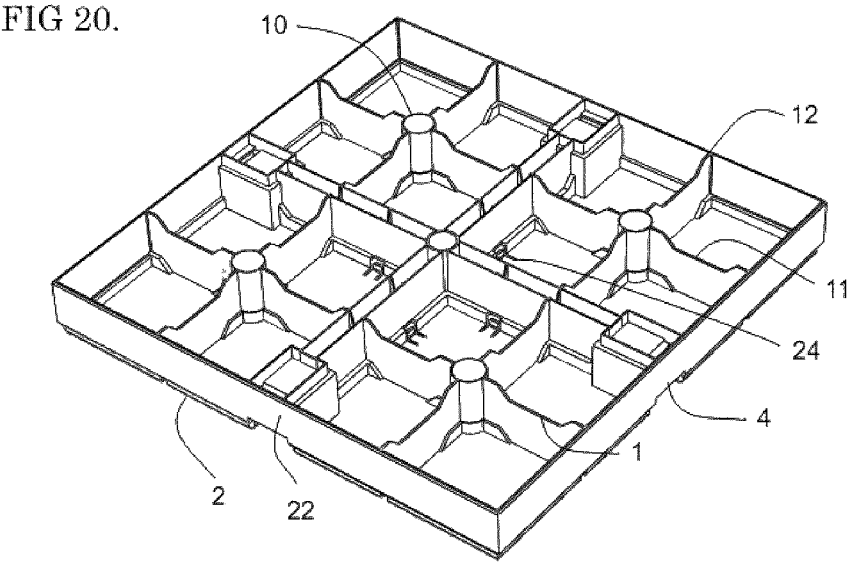
FIG. 20 shows a perspective view of the inside of a floor tile (1) comprising upstanding edges (2), strengthening ribs (11), clampfaces (22), means (12) to clamp on upstanding edges (2) and spaces (4) to store a clampable connection piece.
Figure 21:
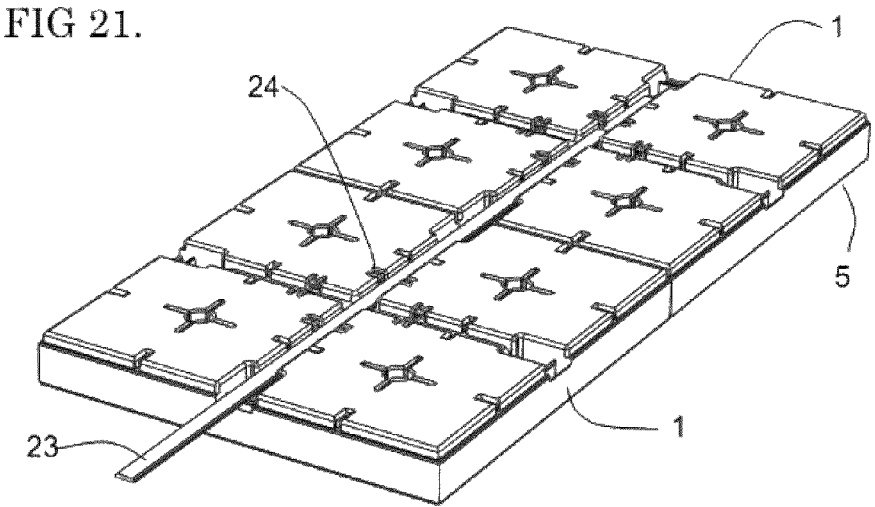
FIG. 21 shows a modular construction (5) comprising two floor tiles (1) and a data cable (23).
Figure 22:
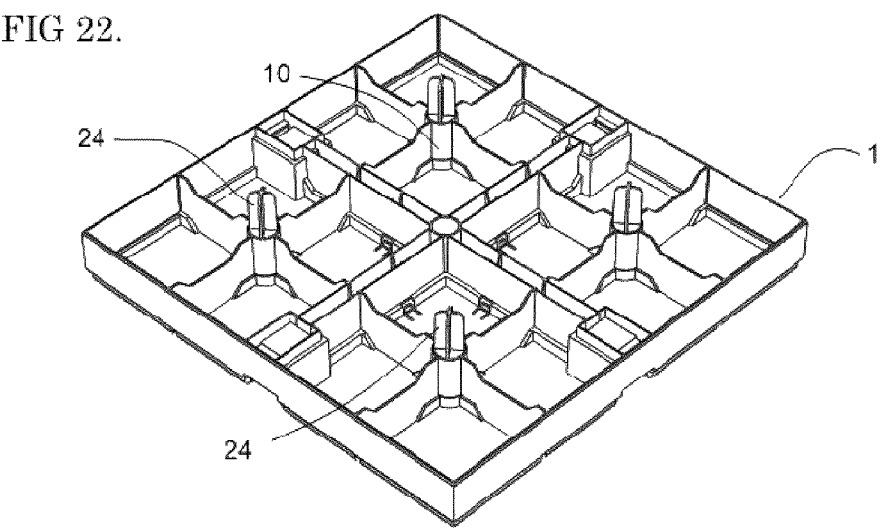
FIG. 22 shows a floor tile (1) and a number of support points (10) in which a vertical connector (24) is mounted.
Figure 23:
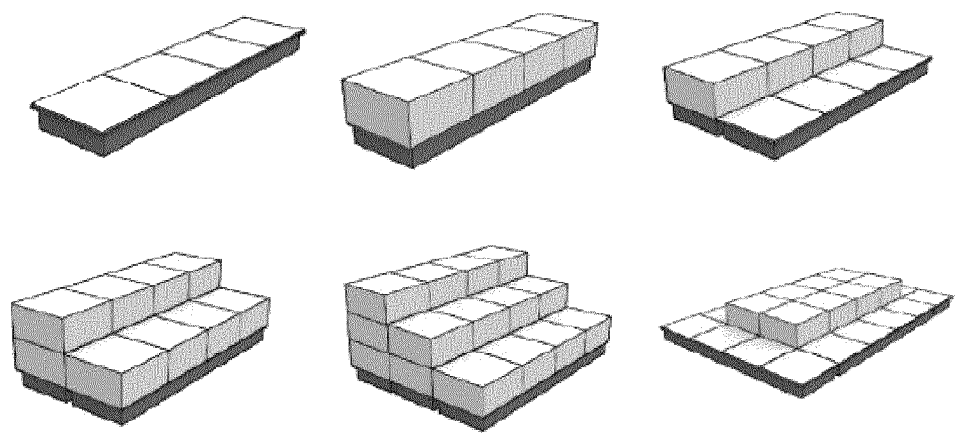
FIGS. 23 to 27 show examples of modular constructions (5) in which floor tiles (1), blocks (7), and cover plates (8) together form a presentation unit.
Figure 24:
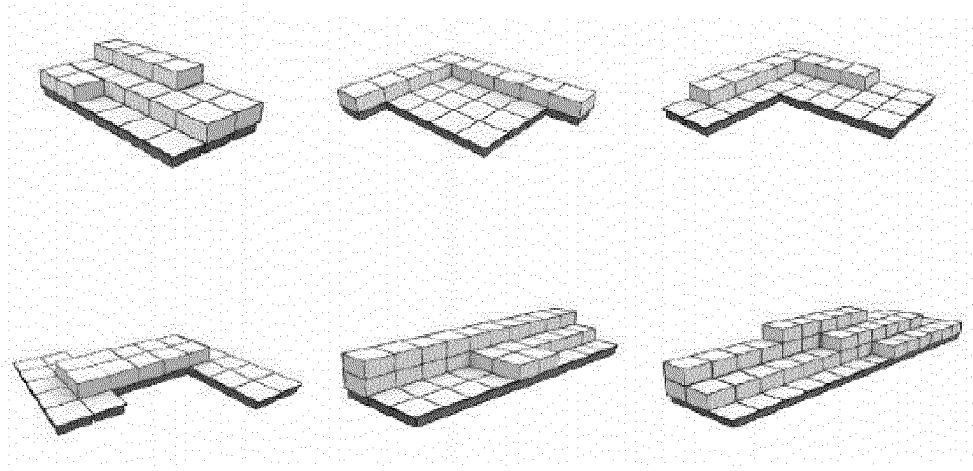
Figure 25:
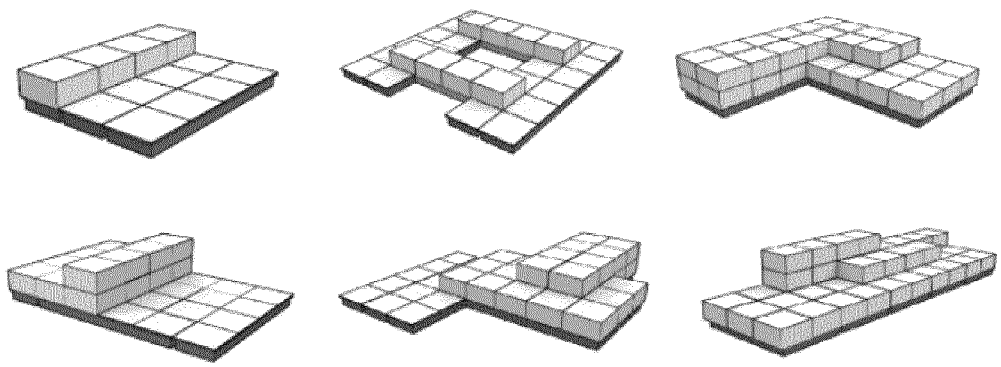
Figure 26:
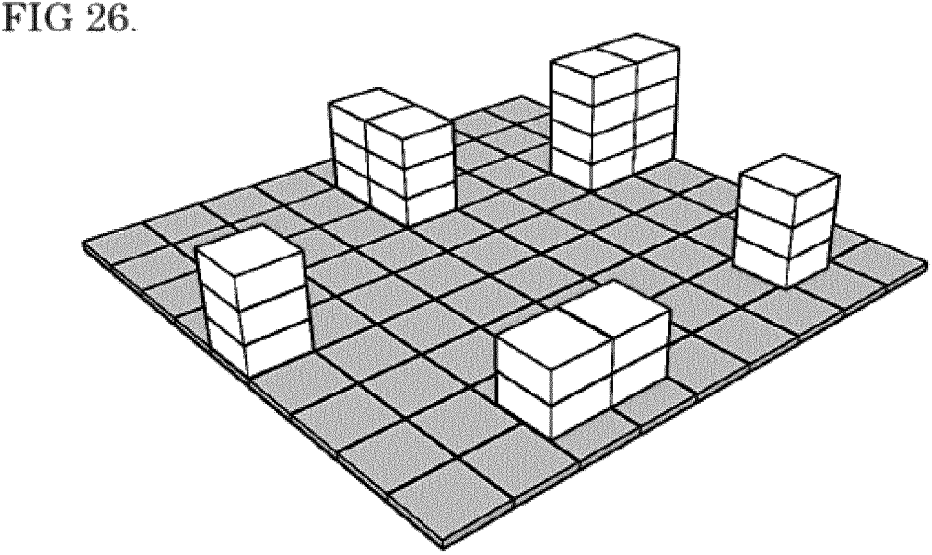
Figure 27:
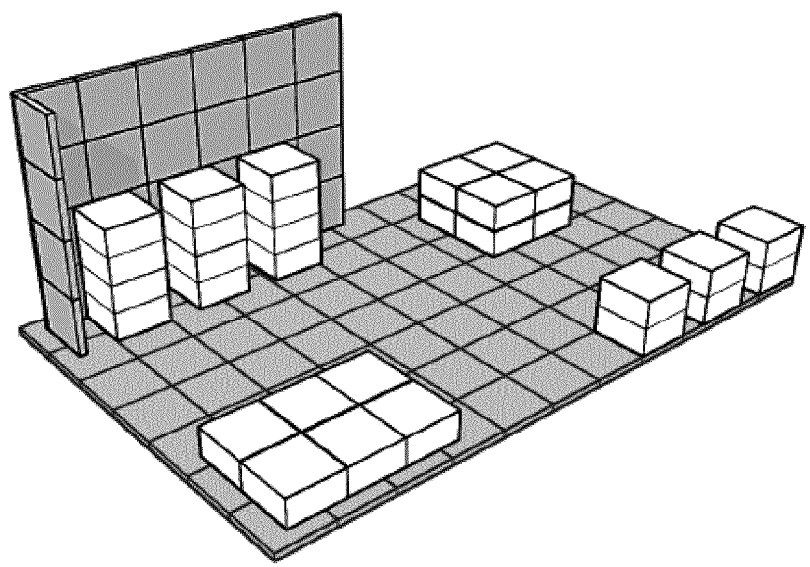

A non-limiting example of an embodiment of the connection piece is shown in FIGS. 17 and 18. The connection piece (18) comprises snap hooks (20), handles (19) for dismounting, and a recess (21). When mounted in the connection recesses (FIG. 17), the two contacting sidewalls of which a piece is enclosed by the recess of the connection piece are unable to relatively move, while the snap hooks and protrusions prevent unwanted accidental removal of the connection piece.

In a preferred embodiment, a floor tile comprises a storage recess for the storage of a connection piece. In an even more preferred embodiment, a floor tile comprises one storage recess per connection recess. For a system comprising a square-shaped open bottom face, a floor tile preferably comprises four connection recesses and four storage recesses. For a system comprising a triangle-shaped open bottom face, a floor tile preferably comprises three connection recesses and three storage recesses. For a system comprising a hexagon-shaped open bottom face, a floor tile preferably comprises six connection recesses and six storage recesses. Preferably, the storage recess corresponding to a connection recess is placed next to the connection recess and inward with respect to the connection recess, i.e. towards the center of the floor tile. Both the connection recess and the storage recess are preferably approachable from above, i.e. from the top floor surface. This allows to first lay out the floor tiles and subsequently take out a connection piece from a storage recess and place it in a corresponding pair of connection recesses without having to move any of the floor tiles. Preferably, the storage recess comprises storage protrusions to fix a connection piece within a storage recess. These storage protrusions may allow clicking of snap hooks behind the storage protrusions. These storage protrusions may in addition or alternatively also effectuate a narrowing storage recess towards the bottom of the storage recess as to clamp a connection piece due to said narrowing.

In a preferred embodiment, a floor tile comprises a weight of at most 4 kg, more preferably a weight of at most 2 kg, and most preferably a weight of at most 1 kg. Preferably, a block comprises a weight of at most 4 kg, most preferably a weight of at most 2 kg. Preferably, a cover comprises a weight of at most 2 kg, more preferably at most 1.2 kg, even more preferably at most 0.8 kg, and most preferably at most 0.4 kg. This allows for easy handling of floor tiles, blocks, and cover plates, by, for example, a shop window dresser.

In a preferred embodiment, each of a floor tile, a block, and a cover plate comprises four sidewalls defining a rectangular-shaped open bottom face comprising a length and a width. The lengths of the rectangular-shaped open bottom faces are in essence identical. The widths of the rectangular-shaped open bottom faces are in essence identical. Preferably, said in essence identical lengths and said in essence identical widths are larger than 35 centimeter, such as 36 cm, 37 cm, 38 cm, 39 cm, 40 cm, 41 cm, 42 cm, 43 cm, 44 cm, 45 cm, 50 cm, 55 cm, 60 cm, 65 cm, 70 cm, 75 cm, 80 cm, 85 cm, 90 cm, 95 cm, 100 cm, 105 cm, 110 cm, 115 cm, 120 cm, or any value in between. Preferably, said in essence identical lengths and said in essence identical widths are at most 120 cm. Preferably the open-bottom faces are in essence square-shaped, comprising an in essence identical length and width. In a most preferred embodiment, said in essence identical length and width are approximately 40 cm.

This is advantageous, as the modular system then comprises large volumes, which are still easily manually displaceable. This allows for a quick and efficient build-up of a presentation podium. Rectangular- or square-shaped bottom faces are preferred over hexagonal- or triangular-shaped bottom faces as many exposition spaces comprise straight walls and in essence cuboid-shaped rooms. With rectangular- or square-shaped bottom faces, one sidewall of the presentation podium can, but should not necessarily, be placed in parallel with a wall of a room. Furthermore, with triangular- or hexagonal-shaped bottom faces, a built up presentation podium will have many visually perceivable seams, due to the necessarily corrugated sidewalls of the presentation podium, which can be avoided when the bottom faces are rectangular- or square-shaped. The advantage of a square-shaped bottom face over a rectangular-shaped bottom face is that it comprises fourfold instead of twofold rotational symmetry. A handler which installs a presentation podium should then perform (in average) less rotations with a block, floor tile, or cover plate before it can be placed.

In a preferred embodiment, the sidewalls of a block or a floor tile narrow towards the corresponding top surface, thereby forming an upstanding edge for clamping. The sidewalls preferably narrow in a stepwise way, comprising a large first upright surface, a small second upright surface for forming the upstanding edge, and a small third surface in essence perpendicular to said first and said second upright surfaces and interconnecting said first and said second upright surfaces. Hereby, the first and second upright surfaces are in essence perpendicular to the bottom face of the block or floor tile to which it belongs. Furthermore, the third surface is in essence parallel to said bottom face of the block or floor tile to which it belongs. A stack comprising a cover plate and one or more of a floor tile and a block then comprises stack planes in essence coinciding with the visible parts of the sidewalls of the components of the stack, i.e. the large first surfaces. The first surfaces thereby form the sidewalls of the stack comprising an in essence seamless appearance. A seamless appearance is advantageous as it is visually pleasing. The presentation podium then visually appears as being monolithic.

In a preferred embodiment, each of a floor tile and a block comprises an internal strengthening rib structure and a top surface which is supportive and in essence closed-off. When the top surfaces of blocks and floor tiles are used for supporting goods, they should comprise sufficient supportive strength to support the goods. The strengthening rib structure effectuates this supportive strength. In an embodiment, a floor tile can additionally or alternatively comprise a support point in which a vertical connector can be mounted, whereby the mounted vertical connector extends from the top floor surface to the open bottom floor face. The mounted vertical connector thereby provides support of the top floor surface.

In a preferred embodiment, the top cover surface of a cover plate is in essence flat and closed-off. The cover plate serves a decorative role and not a structural function. The sidewalls of the cover plate thereto comprise a height configured to let at least a part of the top cover surface of said cover plate rest on the top surface of a block or floor tile when placed over said top surface. A cover plate may be configured to loosely fit over a lower top surface, whereby it is supported by said top surface. "Clamping over" as used in this document therefore also encompasses "loosely fitting over".

In a preferred embodiment, each of the floor tiles is a single-piece component, preferably manufactured by injection molding of a thermoplastic. In a preferred embodiment, each of blocks is a single-piece component, preferably manufactured by injection molding of a thermoplastic. In a preferred embodiment, each of the cover plates is a single-piece component, preferably manufactured by injection molding of a thermoplastic. In a preferred embodiment, each of the connection pieces is a single-piece component, preferably manufactured by injection molding of a thermoplastic. Preferably, a cover plate comprises a wall thickness larger than 1 millimeter and smaller than 3 millimeter. It therefore comprises a thin-walled thermoplastic. This is advantageous as injection molding is easy and cheap. The floor tiles, blocks, and cover plates are thereby in addition lightweight, i.e. easy to handle manually.

Figure 12:
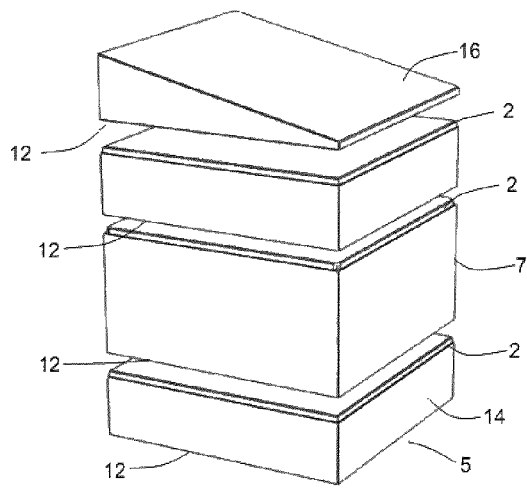
FIG. 12 shows a modular construction (5) comprising a block (7), smaller blocks (14) comprising upstanding edges (2) and means (12) to clamp on upstanding edges (2) and a beveled block (16).
Figure 13:
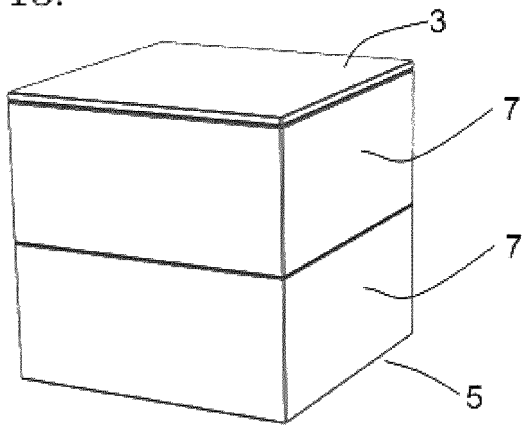
FIG. 13 shows a modular construction (5) comprising two blocks (7) and a closed-off support surface (3).
Figure 14:
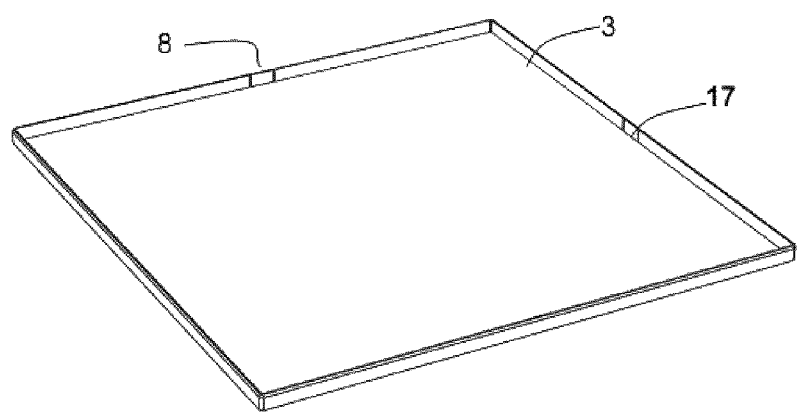
FIG. 14 shows the bottom of a cover plate (8) comprising a closed-off support surface (3) and breaking edges (17) for the cover plate.
Figure 15:
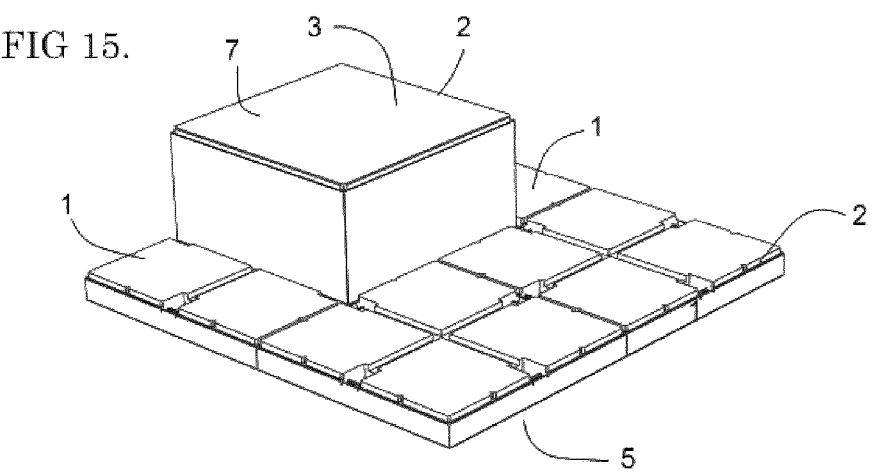
Figure 16:
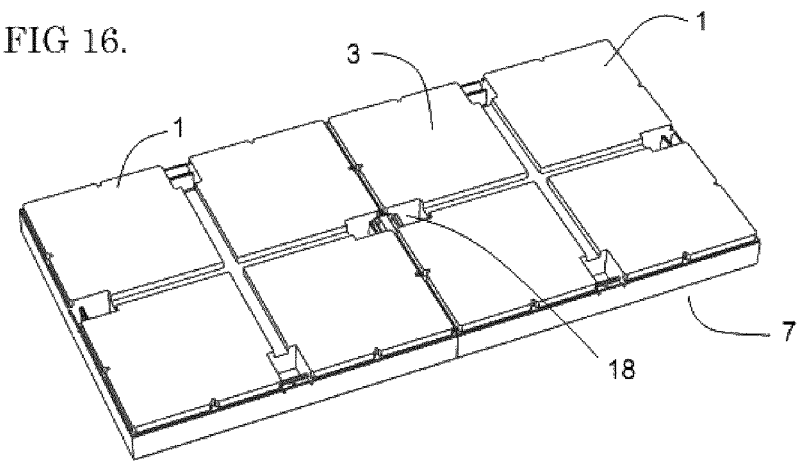
FIG. 16 shows a modular floor basis (6) comprising two floor tiles (1) comprising a closed-off top surface (3) and a clampable connection piece (18) to interconnect floor tiles.

In a preferred embodiment, the modular presentation system comprises a beveled block. The beveled block thereby comprises an in essence rectangular-shaped flat closed-off top bevel surface, and three bevel sidewalls. The top bevel surface and the three bevel sidewalls define an open bottom bevel face. One of the bevel sidewalls is in essence rectangular, while two of the bevel sidewalls are in essence triangular. The beveled block thereby forms a ramp. It can be integrated in a presentation podium for the quick and easy placement of large rollable equipment on the presentation podium. A non-limiting example of a beveled block (16) is shown in FIG. 12.

In a preferred embodiment, the floor tiles, blocks, and cover plates comprise beveled edges. Preferably the bevel of the edges is in between 3 millimeter and 6 millimeter. When a construction is made of different elements, the beveled edges of adjacent corresponding elements will be mirrored with respect to each other, which results in an assembled seam which comprises the visual appearance of a diamond and which is aesthetically pleasing for a spectator.

In a second aspect, the present invention provides a build-up method for the modular presentation system according to the first aspect. The method comprises the steps of:

a. providing at least two floor tiles, at least one block, and at least one cover plate, each of said elements comprising a top surface and sidewalls defining an open bottom face, said floor tiles further each comprising at least one connection recess for interconnection;
b. providing at least one connection piece;
c. providing an in essence flat subsurface;
d. placing two of the plurality of floor tiles adjacently on said subsurface, said two adjacently placed floor tiles comprising a pair of contacting sidewalls;
e. approaching said two adjacently placed floor tiles with a connection piece in a direction in essence perpendicular to the subsurface, thereby mounting said connection piece in a connection recess of each of the two adjacently placed floor tiles;
f. placing the sidewalls of a block over the top surface of a floor tile or another block; and
g. placing the sidewalls of a cover plate over the top surface of a floor tile or a block.

In a preferred embodiment of the method, a floor tile comprises a storage recess for storing a connection piece, and the method comprises prior to step e., and preferably after step d., the step of taking out said connection piece from said storage recess.

One of ordinary skill in the art will appreciate that any features of the first aspect of the invention can also pertain to the second aspect of the invention, as they are strongly interrelated.

The invention is further described by the following non-limiting example which further illustrates the invention, and is not intended to, nor should it be interpreted to, limit the scope of the invention.

EXAMPLE

This example pertains to a particular embodiment of the invention and is not intended to, nor should it be interpreted to, limit the scope of the invention.

In this embodiment, all floor tiles are identical. The bottom floor face of the floor tiles is square-shaped, whereby the square comprises an edge of 40 cm. The floor tiles furthermore comprise a height of 5 cm. The upstanding edges thereby comprise a height of 1 cm and the remainder of the sidewalls, i.e. the large first upright surfaces, comprise a height of 4 cm. The floor tiles comprise a cross-shaped recess comprising a height of 1 cm and a width of at least 1.8 cm. Each of the axes of the cross-shaped recess runs parallel with at least one of the edges of the square-shaped bottom floor face of the floor tile. The cross-shaped recess is also centered with respect to the top floor surface, dividing the top floor surface in four identical upstanding volumes. The floor tiles furthermore each comprise four connection recesses comprising a sidewall which is a portion of a sidewall of the floor tile. The connection recesses are positioned centrally with respect to the sidewall to which they correspond. Each connection recess in addition has a second sidewall which it shares with a storage recess. The floor tiles thus each comprise four connection recesses and four storage recesses. The storage recesses are configured to allow placement of a connection piece so that the connection piece does not come higher than the height of the cross-shaped recess. The connection recesses are configured so that when they are in use, i.e. interconnected with another connection recess by means of connection piece, the connection piece does not come higher than the height of the cross-shaped recess. In other words, when a connection piece is stored in a storage recess, it does not hinder cable transit as it does not protrude into the cross-shaped channel. Likewise for the connect recess: when a connection piece is mounted in a pair of connection recesses for interconnecting two floor tiles, it does not hinder cable transit as it does not protrude into the cross-shaped channels of said two floor tiles. As the cross-shaped recess comprises a bottom wall which lies below the top floor surface, i.e. in between the top floor surface and the open bottom face wall, a connection piece stored in a storage recess also does not protrude beyond the top floor surface. In other words, a connection piece stored in a storage recess lies fully below the top floor surface.

In this embodiment, not all blocks should be identical. There are one, two, three, or more categories of identical blocks. All blocks of all categories comprise a bottom block face which is square-shaped, whereby the square comprises an edge of 40 cm. The block categories are characterized in that the corresponding blocks comprise a different height per category. At least one category comprises blocks comprising a height of 20 cm. It is possible that the system comprises other block categories, for example a block category comprising blocks comprising a block height of 5, 10, 15, 25, 30, 35, or 40 cm. The upstanding edges thereby comprise again a height of 1 cm and the remainder of the sidewalls, i.e. the large first upright surfaces, comprise a height equal to the height of the block lowered with this 1 cm.

In this embodiment, the bottom cover face of cover plates is square-shaped, whereby the square comprises an edge of 40 cm. The cover plates furthermore comprise a height of 1.2 cm and a wall thickness of 0.2 cm. Furthermore, in this embodiment, the system comprises at least one cover plate for each floor tile.

In this embodiment, all connection pieces are identical. The connection pieces comprise a height of at least 2.6 cm and at most 2.7 cm, a width (handle to handle) of 3.5 cm when uncompressed, and a length (orthogonal to height and width, parallel to handle edge) of 3.5 cm.

The invention claimed is:

1. A modular presentation system for the display and support of goods, comprising:
    two or more floor tiles (1), each floor tile comprising a top floor surface (3), floor sidewalls to support the top floor surface, and at least one connection recess, the floor sidewalls furthermore defining an open bottom floor face;
    one or more blocks (7), each block comprising a top block surface (3) and block sidewalls (9) to support the top block surface, the block sidewalls furthermore defining an open bottom block face;
    one or more cover plates (8), each cover plate comprising a top cover surface and cover sidewalls defining an open bottom cover face; and
    one or more connection pieces (18), each connection piece configured for interconnecting two floor tiles of the system by mounting the connection piece in a connection recess of said at least one connection recess of each of said two floor tiles,
    whereby the sidewalls of each block and floor tile of the system narrow towards the corresponding top surface, thereby forming an upstanding edge (2), whereby the sidewalls of each floor tile, block and cover plate are configured for clamping the sidewalls, which sidewalls define as said an open bottom face, on the upstanding edge of another block or floor tile of the system and over the top surface of said other block or floor tile of the system,
    whereby said connection piece (18) and said connection recesses of said two floor tiles are configured for mounting said connection piece in said connection recesses after placing said two floor tiles adjacent, whereby said two adjacently placed floor tiles have two contacting sidewalls, whereby said connection piece comprises a recess (21) for placement of the recess over said two contacting sidewalls of said two adjacently placed floor tiles, and whereby said connection piece is mountable in said connection recesses via approach of said connection piece towards said connection recesses from the top floor surfaces of said two floor tiles.

2. A modular presentation system according to claim 1, wherein a said connection piece comprises snap hooks (20) and handles (19) for dismounting the connection piece, whereby each connection recess of said connection recesses comprises a protrusion behind which at least one of the snap hooks can be positioned.

3. A modular presentation system according to claim 1, wherein each connection piece is dismountable from all floor tiles.

4. A modular presentation system according to claim 1, wherein a floor tile of the system comprises a storage recess (4) for the storage of a connection piece, which storage recess (4) is approachable with the connection piece from the top floor surface.

5. A modular presentation system according to claim 4, wherein the storage recess of the floor tile is configured for storing a connection piece in a position fully below the top floor surface.

6. A modular presentation system according to claim 4, wherein the storage recess comprises protrusions to fix a connection piece within a storage recess.

7. A modular presentation system according to claim 1, wherein each floor tile, block, and cover plate of the system comprises four sidewalls defining a rectangular-shaped open bottom face comprising a length and a width, whereby the lengths of the rectangular-shaped open bottom faces are identical, and whereby the widths of the rectangular-shaped open bottom faces are identical.

8. A modular presentation system according to preceding claim 7, wherein the top floor surfaces of the floor tiles comprise a cross-shaped recess defining four identical upstanding volumes, whereby the system is configured to clamp the sidewalls of a floor tile, a block, or a cover on any four mutually neighboring upstanding volumes of an interconnected plurality of floor tiles, said cross-shaped recesses of said interconnected plurality of floor tiles further providing a passage network for cables through the top floor surfaces of said interconnected plurality of floor tiles.

9. A modular presentation system according to claim 1, wherein a stack comprises components of the system, the components comprising a cover plate of the system and one or more of a floor tile of the system and a block of the system, wherein the stack comprises stack planes coinciding with the visible parts of the sidewalls of the components of the stack, thereby forming sidewalls of the stack comprising seamless appearance.

10. A modular presentation system according to claim 1, wherein each floor tile and block of the system comprises an internal strengthening rib structure, wherein the top surface of each floor tile and block of the system is supportive and closed-off.

11. A modular presentation system according to claim 1, wherein a floor tile of the system comprises a support point in which a vertical connector can be mounted, the mounted vertical connector extending from the top floor surface to the open bottom floor face.

12. A modular presentation system according to claim 1, wherein the top cover surface of a cover plate of the system is flat and closed-off.

13. A modular presentation system according to claim 1, wherein each of the floor tiles, blocks, and cover plates of the system is a single-piece component.

14. A modular presentation system according to claim 1, wherein the sidewalls of each of the floor tiles, blocks, and cover plates of the system comprise beveled edges.

15. A modular presentation system according to claim 1, wherein the modular presentation system comprises a beveled block, wherein the beveled block comprises a rectangular-shaped flat closed-off top bevel surface and three bevel sidewalls, the beveled block thereby forming a ramp.

16. A modular presentation system according to claim 1, wherein each sidewall of said sidewalls comprises a portion on either side of said top surface when clamped over said top surface, one portion of which being tangent to said upstanding edge.

17. Build-up method for a modular presentation system for the display and support of goods, the method comprising the steps of:
 a. providing at least two floor tiles (1), at least one block (7), and at least one cover plate (8), each of said elements comprising a top surface (3) and sidewalls (9) defining an open bottom face, said floor tiles further each comprising at least one connection recess for interconnection;
 b. providing at least one connection piece (18) comprising a recess (21);
 c. providing flat subsurface;
 d. placing two of the at least two floor tiles adjacently on said subsurface, said two adjacently placed floor tiles comprising a pair of contacting sidewalls;
 e. approaching said two adjacently placed floor tiles with a connection piece in a direction perpendicular to the subsurface, thereby placing the recess (21) of the connection piece (18) over the pair of contacting sidewalls, and thereby further mounting said connection piece in a connection recess of said at least one connection recess of each of the two adjacently placed floor tiles;
 f. placing the sidewalls of a block over the top surface of a floor tile or another block; and
 g. placing the sidewalls of a cover plate over the top surface of a floor tile or a block.

18. Build-up method according to claim 17, wherein a floor tile of said at least two floor tiles comprise a storage recess (4) for storing a connection piece, the method comprising prior to step e the step of taking out said connection piece from said storage recess.

19. Build-up method according to claim 17, wherein the sidewalls of each block and floor tile narrow towards the corresponding top surface, thereby forming an upstanding edge, whereby the sidewalls of each cover plate, block and floor tile are configured for clamping the sidewalls, which sidewalls define as said an open bottom face, on the upstanding edge of another block or floor tile and over the top surface of said other block or floor tile.

20. Build-up method according to claim 19, wherein each sidewall of said sidewalls comprises a portion on either side of said top surface when clamped over said top surface, one portion of which being tangent to said upstanding edge.

\* \* \* \* \*